United States Patent [19]

Haney et al.

[11] Patent Number: 4,792,399
[45] Date of Patent: Dec. 20, 1988

[54] LIQUID COLLECTING AND RETAINING DEVICE

[75] Inventors: Glen K. Haney, 110 Wynnmeade Pkwy., Peachtree City, Ga. 30269; Victor Kramer, Atlanta, Ga.

[73] Assignee: Glen Kyle Haney, Jonesboro, Ga.

[21] Appl. No.: 80,807

[22] Filed: Aug. 3, 1987

[51] Int. Cl.⁴ ............................................. C02F 1/40
[52] U.S. Cl. ........................... 210/484; 210/502.1; 210/924; 134/7
[58] Field of Search ............ 210/671, 693, 242.4, 210/924, 484, 485, 497.01, 502.1, 503–505; 134/7

[56] References Cited

U.S. PATENT DOCUMENTS

| | | | |
|---|---|---|---|
| 3,679,058 | 7/1972 | Smith | 210/924 X |
| 4,025,438 | 5/1977 | Gelman et al. | 210/484 |
| 4,102,783 | 7/1978 | Zenno et al. | 210/693 X |
| 4,340,486 | 7/1982 | Swanson | 210/924 X |
| 4,366,067 | 12/1982 | Golding et al. | 210/924 X |
| 4,401,475 | 8/1983 | Eriksson et al. | 210/924 X |
| 4,430,223 | 2/1984 | Miyakawa et al. | 210/497.01 X |
| 4,497,712 | 2/1985 | Cowling | 210/924 X |
| 4,537,877 | 8/1985 | Ericsson | 210/924 X |
| 4,659,478 | 4/1987 | Stapelfeld et al. | 210/924 X |
| 4,728,423 | 3/1988 | Kuwajima | 210/497.01 X |

Primary Examiner—Tom Wyse
Attorney, Agent, or Firm—David P. Kelley

[57] ABSTRACT

A liquid collecting and retaining device consists of a tubular, triangularly shaped casing of a material substantially non-porous to granular solid matter and which is permeable to liquids, which is partially filled with a material that collects and retains liquids passing through the casing, and which is incapable of itself passing through the casing.

14 Claims, 1 Drawing Sheet

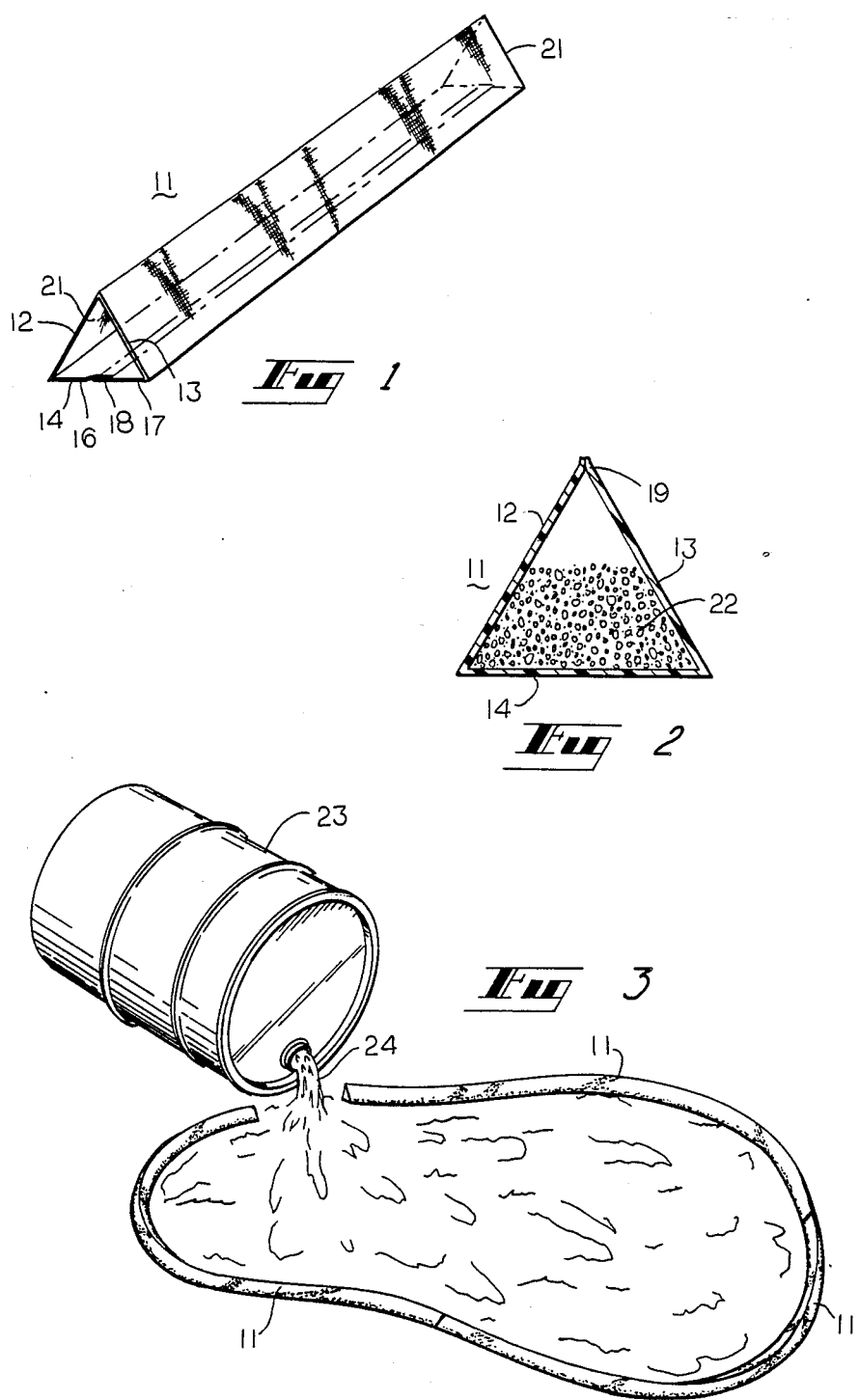

LIQUID COLLECTING AND RETAINING DEVICE

BACKGROUND OF THE INVENTION

This invention relates to a liquid collecting member and, more particularly, to a tubular absorbent member for collecting liquid spills, leaks, or drips, both to prevent the spread thereof and to remove the liquid.

Unwanted liquid spills such as, for example, oil spills around machinery, chemical spills in, for example, laboratories, blood in hospital operating rooms, and various liquids in food processing plants are often hazardous to personnel in the vicinity thereof, can create degradation of the breathable atmosphere, destroy the antiseptic integrity of an operating room, and present a danger of contamination in food processing.

Efforts to deal with such spills range from throwing diatomaceous earth or clay on the spill and, after absorption, sweeping or shoveling it up, to various types of porous socks or pillows filled with absorbing material to absorb the spill. One such device is shown in U.S. Pat. No. 4,497,712 Cowling, which comprises a pillow having a plurality of pockets which are partially filled with granular absorbing material. The material of the pillow itself has a high permeability to liquids. However, the pillow lacks flexibility and must be placed over the spill to be effective. Another type of device is shown in U.S. Pat. No. 4,340,486 Swanson which comprises a mass of hydrophobic netting material which relies upon the tendency of oil to bridge the openings in the netting on a short term basis, thereby enabling the user to collect large amounts of spilled oil, for example.

A very common type of device is a tubular member of nylon weave or even cheesecloth or other loosely knit material filled with absorbing material such as ground up corncobs, several of which are placed around the spill to confine it to as small an area as possible, and which then absorbs the spilled liquid. This latter type of device, because of its substantially circular cross-section, does not have a large area of contact with the floor or whatever surface the spill overlays, and hence the aborpiton process is slowed down. All of the preceding arrangements are relatively slow in their actions where often speed is required. Also, in the treatment of acid spills, the acid tends to break down the fabric of the device, and also to attack and destroy the effectiveness of the absorbent material.

In food processing plants, most of the devices of the prior art cannot, because of Federal restrictions, be used. Where the absorbing material is ground up solid matter, such as corncobs or other cellulosic material, a large amount of minute particles, i.e., dust, escapes from the porous container and itself can act as a food contaminant. Federal requirements are such that most spills have to be treated with detergents and mopped up to avoid contamination. Even then care must be exercised in the use of the detergent to avoid contamination thereby. Such a process is necessarily a slow one.

SUMMARY OF THE INVENTION

The present invention overcomes the shortcomings of the prior art while retaining the advantages thereof.

In a preferred embodiment of the invention, a flexible tubular casing member of a non-woven polypropylene fabric which is thermoplastic in nature, i.e., under heat it can be molded to a particular shape which it retains upon cooling, is molded to have a triangular cross-section. The fabric itself is substantially non-porous to solid granular material. The tubular member is partially filled with a suitable absorbing material such as ground up corncobs or cellulose material having a particle size in the range of 400 to 3200 microns. The fabric of the tubular member is non-porous to any granular solid material of 300 microns or greater particle size, hence there can be no escape of "dust" when the tubular member is dropped onto or around the spill.

Because of its triangular shape, a large surface area of the member is always in contact with the spill, thus giving an increased rate of spill treatment over devices of the prior art. It is preferred that the cross-sectional shaped be that of an equilateral triangle so that when dropped into place, the same surface area will be in contact with the spill regardless of how it lands.

Liquid of whatever nature is passed through the casing material and is collected and retained by the filling material. In the case of hydrocarbon liquids, the casing absorbs the liquid, whereas in the case of most other liquids, the casing material permits the liquid to pass through by the process of adsorption. To facilitate both processes, the material can be treated with a surfactant or wetting agent, such as, for example, a soap solution.

In an embodiment of the invention for use with acid or other corrosive liquid spills, the absorbent filling is treated with wax or paraffin, such as by soaking and impregnation. The material then acts as an adsorbent for the liquid and collects it in much the same amounts as if it were absorbent.

These and other advantages and features of the present invention will be more readily apparent from the following detailed description, read in conjunction with the drawings in which:

FIG. 1 is a perspective view of the tubular member embodying the principles of the invention;

FIG. 2 is a cross-sectional view of the tubular member illustrating the disposition of the absorbent filling; and FIG. 3 is a perspective view illustrating the disposition of tubular elements of the invention in drawing and absorbing a liquid spill.

DETAILED DESCRIPTION

FIGS. 1 and 2 depict a flexible tubular absorbent member 11 embodying the principles of the invention. By absorbent in this instance is meant the ability to collect and retain liquid, either by absorption or adsorption. As will be apparent hereinafter, the two phenomena are both used in the present invention. Tubular member 11 is of triangular cross section and has three sides 12, 13, and 14. The material of member 11 is preferably of spun bonded, non-woven polypropylene such as Kimberly-Clark material #13950 which is inert to all but the strongest acids and bases. Such material is thermoplastic so that it can be heat molded into a triangular shape and will retain that shape upon cooling. As shown in FIG. 1, side 14 is made up of two parts 16 and 17 which overlap and are bonded along seam 18. Alternatively any two sides, such as 12 and 13 in FIG. 2, may be bonded as at 19 to create a closed structure. Triangular end pieces 21, 21 are bonded to the sides 12, 13, and 14 at the ends thereof to close the tube. Tube 11 is approximately 65% filled with a suitable liquid collecting and retaining material 22, which may be made of ground up corncobs, ground up cellulose material such as, for example, cellulose based cigarette filter material, cotton, paper pulp, or as will be explained hereinafter, wax treated cellulose material. Because the material is loose within the tube, it will tend to cover the interior over whichever side of the tube is in contact with the spill.

The polypropylene material of the tube 11 is non-porous to solid materials of a particle size greater than 300 microns diameter. The filler material 22 is screened so that it consists of particles in the range of 400 to 3200 microns diameter. As a consequence, there is no "dust" of minute particles to leak out of the tube during use. This is of especial utility in food processing since Federal law prohibits the use of devices which utilize absorbing materials having a "dust" component in the treatment of liquid spills in food processing plants.

In FIG. 3 there is shown the use of a plurality of members 11 in confining and removing spilled liquid 24 shown pouring out of a drum 23. As an example, if member 11 is 60 inches long, and each of the sides 12, 13, and 14 is approximately 4.5 inches in width, then a surface area of 270 sq. inches or more is in contact with the liquid at all times for each of the members 11. This is a far greater area than that shown in the devices of the prior art. The liquid is drawn into the solid matrix of the material of the tube by capillary action, and the greater the surface area, the greater the cumulative capillary action. Except for some hydrocarbon liquids, which are absorbed by the material of the tube and passed through, the liquid passes through the material by adsorption and into the material 22 within the tube. The material 22 collects and retains the liquid within the tube by absorption or adsorption and is capable of holding large amounts thereof.

Cellulose polymers are easily hydrolyzed by strong acids into monomeric form, which destroys the structure of the absorbing material by destroying the alpha linkage. The alpha bond can be protected by shielding with paraffin, hence, where acid spills are to be dealt with, the cellulose based material is soaked in paraffin, which protects the integral structure of the polymer while permitting adsorption of the acid.

In all cases, the process of collecting the liquid spill commences with capillary action, and the ultimate collection and retention of the liquid is by either absorption or adsorption.

From the foregoing it can be seen that the device of the present invention, because of its unique shape, collects and retains liquid spills at a greater rate than prior art devices. Furthermore, it is useful with virtually any type liquid except the most corrosive of acids or bases. In addition, the device itself does not release contaminating material to the outside, hence it is safe for use in applications requiring extremely sanitary or sterile conditions.

The foregoing has been by way of illustrating a preferred embodiment of the invention. Various modifications thereto may occur to workers in the art without departure from the spirit and scope of the invention.

We claim:

1. A liquid collecting and retaining member for use in the treatment of liquid spills comprising a tubular casing member of thermoplastic, non-woven, absorbent material that is porous to liquids but substantially non-porous to granular solid matter, said casing member having a triangular cross-section, a filling material contained within said casing, said filling material being capable of collecting and retaining liquid that passes through said casing, and means closing the ends of said casing member.

2. A liquid collecting and retaining member as claimed in claim 1, wherein the material of said casing member is a bonded, non-woven polypropylene fabric.

3. A liquid collecting and retaining member as claimed in claim 1 wherein the material of said casing is non-porous to granular solid material having a particle size of 300 microns or more.

4. A liquid collecting and retaining member as claimed in claim 1 wherein said filling material comprises ground up cellulose material having a particle size of 400 microns or more.

5. A liquid collecting member as claimed in claim 1 wherein said filling material comprises a ground up cellulose polymer impregnated with wax.

6. A liquid collecting and retaining member as claimed in claim 1 wherein the cross-sectional shape of said tubular casing member is an equilateral triangle.

7. A liquid collecting and retaining member for use in the treatment of liquid spills comprising a tubular casing member of thermoplastic polypropylene non-woven fabric, said fabric being permeable to liquids and non-porous to granular solid matter of a particle size greater than 300 microns, said tubular casing member having a triangular cross-sectional shape, means within said casing for collecting and retaining liquids therein, said means comprising a granular solid material having a particle size greater than 400 microns and means closing the ends of said casing member.

8. A liquid collecting and retaining member as claimed in claim 7 wherein the particle size of said granular solid material is within the range of 400 to 3200 microns.

9. A liquid collecting and retaining member as claimed in claim 7 wherein said means closing the ends of said casing comprises triangular shaped nenbers sealed to the sides of said casing member at the ends thereof.

10. A liquid collectively and retaining member as claimed in claim 7 wherein two of the sides of the triangularly shaped cassing members are bonded together to form a seam along the length of said tubular casing member.

11. A liquid collecting and retaining member as claimed in claim 7 wherein the granular solid material fills approximately 65% of the interior of said tubular casing member.

12. A liquid collecting and retaining member as claimed in claim 7 wherein said granular solid material comprises a ground up cellulose polymer impregnated with wax.

13. A liquid collecting and retaining member as claimed in claim 7 wherein one of the sides of the triangular shaped casing member comprises two overlapping parts, said parts being sealed at the overlap along the length of said casing member.

14. A liquid collecting and retaining member as claimed in claim 7 wherein said tubular casing member is flexible.

* * * * *